United States Patent [19]

Taylor

[11] Patent Number: 4,877,114
[45] Date of Patent: Oct. 31, 1989

[54] ADJUSTABLE FLUID AMPLIFIED SHOCK ABSORBER

[75] Inventor: Paul H. Taylor, Grand Island, N.Y.

[73] Assignee: Tayco Developments, Inc., North Tonawanda, N.Y.

[21] Appl. No.: 221,477

[22] Filed: Jul. 19, 1988

[51] Int. Cl.$^4$ .............................................. F16F 9/34
[52] U.S. Cl. .................................... 188/285; 188/317; 188/322.15; 188/322.22
[58] Field of Search ............... 188/285, 288, 317, 319, 188/320, 322.15, 322.19, 322.22

[56] References Cited

U.S. PATENT DOCUMENTS

| | | | |
|---|---|---|---|
| 2,182,016 | 12/1939 | Deutsch | 188/319 |
| 2,760,603 | 8/1956 | Ferrarotti et al. | 188/320 |
| 3,161,908 | 12/1964 | Walach | 188/285 X |
| 3,722,640 | 3/1973 | Taylor . | |
| 4,064,977 | 12/1977 | Taylor . | |
| 4,307,875 | 12/1981 | Schnitzius et al. | 188/288 X |
| 4,558,767 | 12/1985 | Taylor . | |
| 4,582,303 | 4/1986 | Taylor . | |
| 4,591,033 | 5/1986 | Taylor | 188/317 |
| 4,638,895 | 1/1987 | Taylor . | |

FOREIGN PATENT DOCUMENTS

| | | | |
|---|---|---|---|
| 610719 | 10/1960 | Italy | 188/319 |
| 1249 | of 1914 | United Kingdom | 188/319 |

Primary Examiner—Duane A. Reger
Attorney, Agent, or Firm—Joseph P. Gastel

[57] ABSTRACT

An adjustable fluid amplified shock absorber including a casing having a chamber, a piston rod slidable in the casing, a piston head mounted on the piston rod within the chamber, an adjustable channel located between the piston head and piston rod for providing different levels of fluid amplified flow, the adjustable channel being changed in size by axially moving the piston head relative to the piston rod by a threaded connection therebetween, and serrations on the piston head for engagement with grooves on the casing to hold the piston head against rotation while the piston rod is being turned during adjustment.

25 Claims, 3 Drawing Sheets

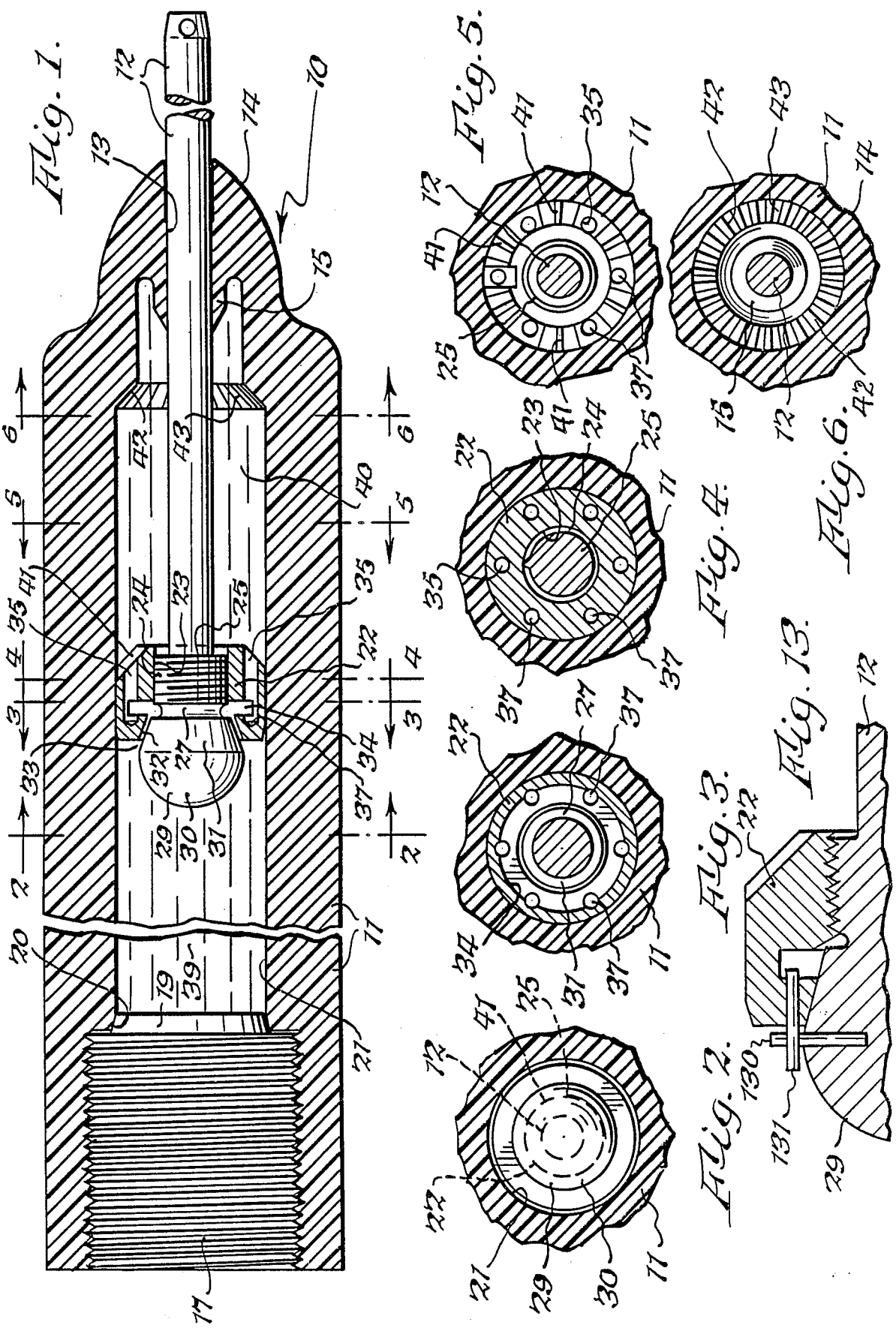

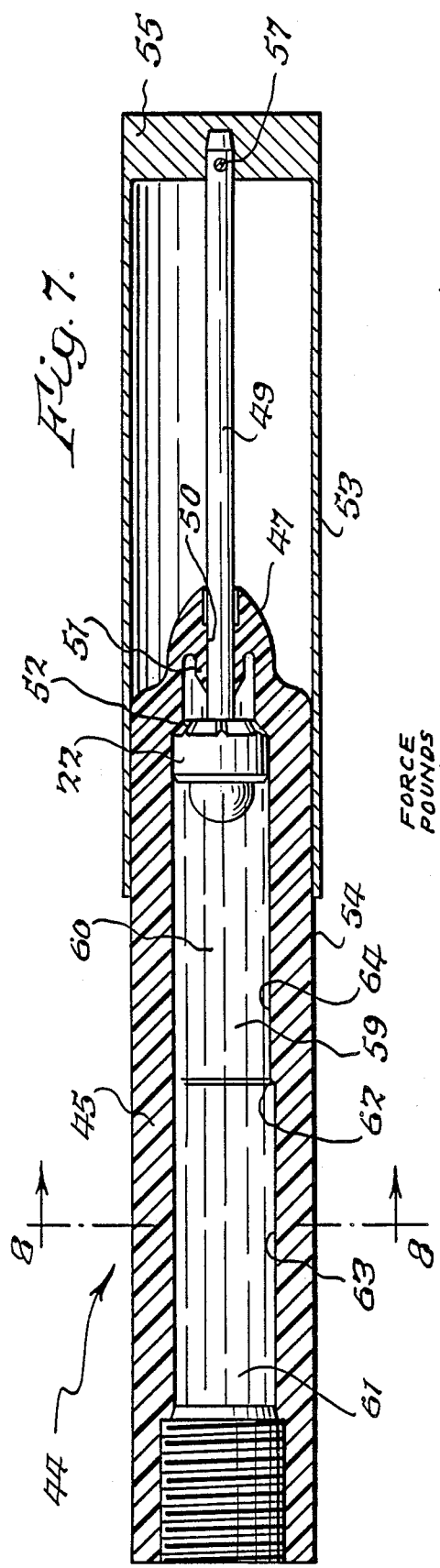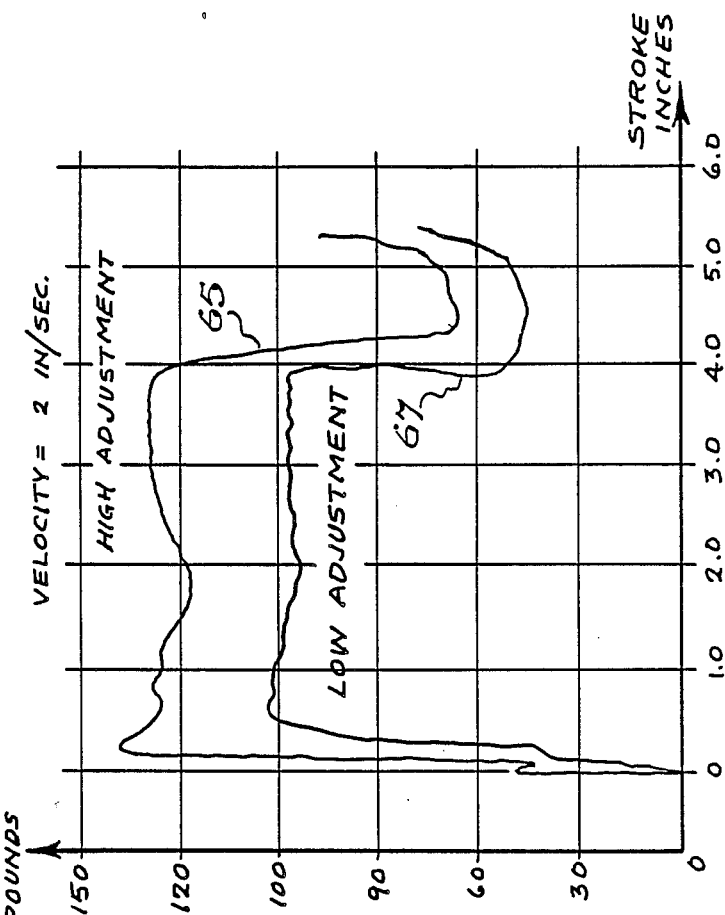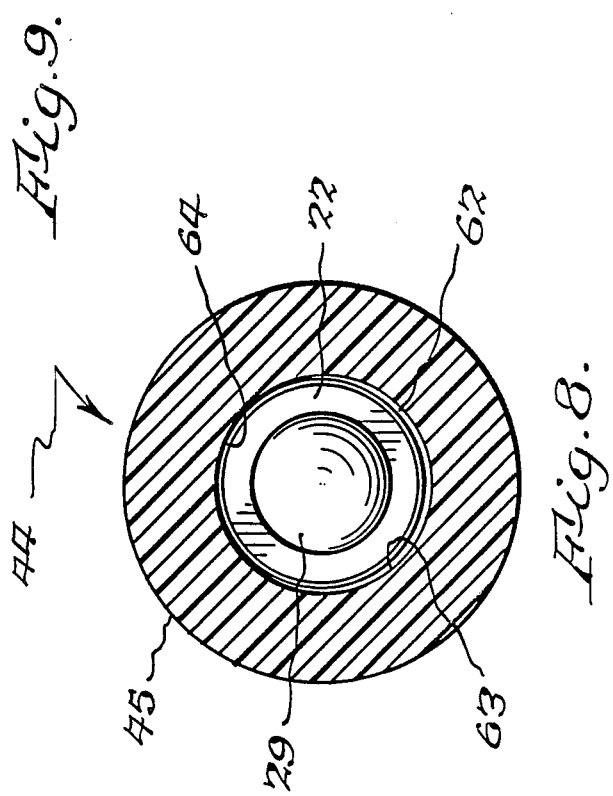

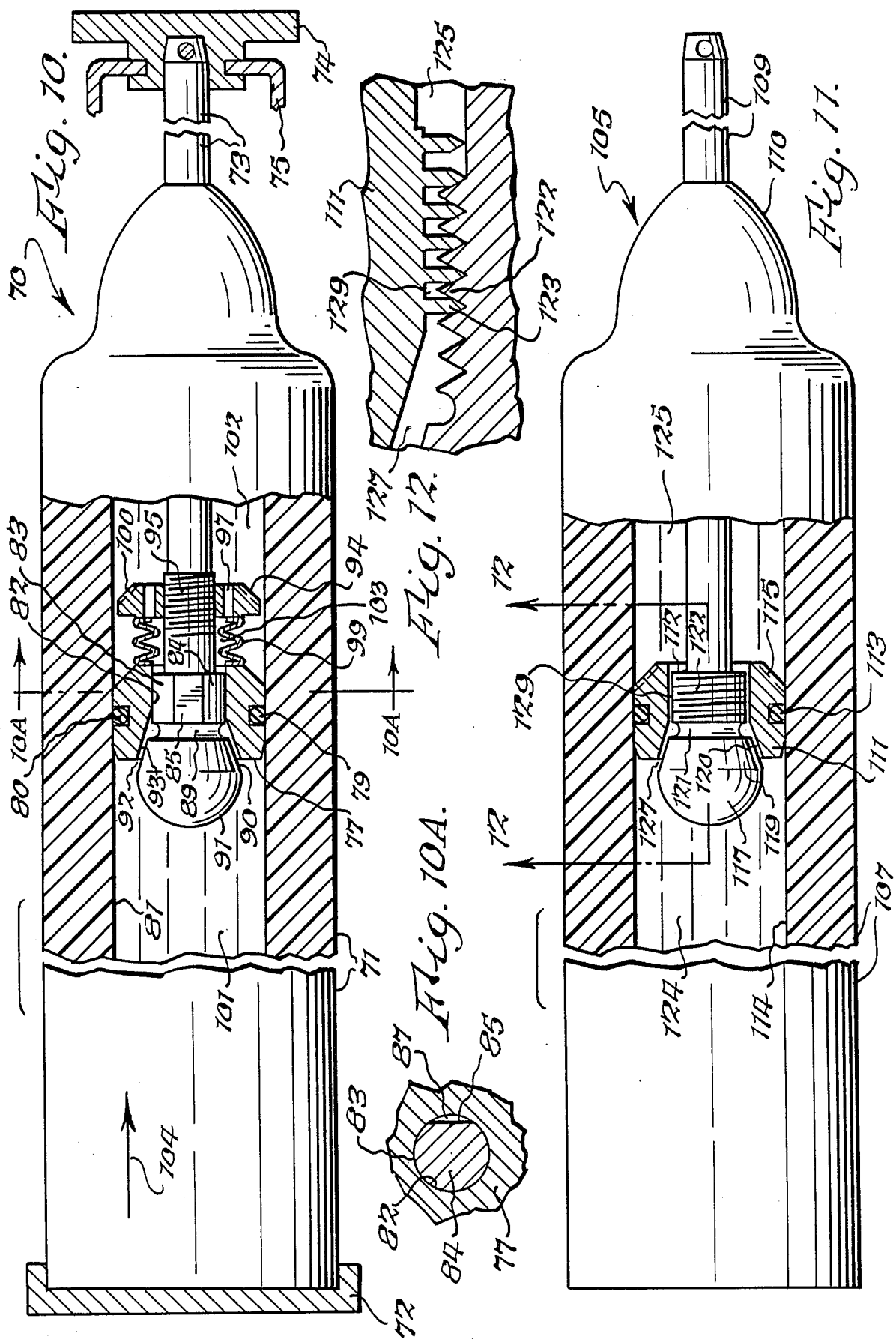

ADJUSTABLE FLUID AMPLIFIED SHOCK ABSORBER

BACKGROUND OF THE INVENTION

The present invention relates to an adjustable fluid amplified shock absorber.

By way of background, fluid amplified shock absorbers of various types are known. Examples of such devices are disclosed in U.S. Pat. Nos. 3,722,640 and 4,064,977. However, insofar as known to applicant, fluid amplified shock absorbers were not adjustable to provide different levels of shock absorbing capacity while in an assembled condition.

SUMMARY OF THE INVENTION

It is one important object of the present invention to provide a fluid amplified shock absorber which can be adjusted without disassembly.

Another object of the present invention is to provide an adjustable fluid amplified shock absorber which can also function as a liquid lock and which becomes effective only when subjected to shock forces above a predetermined value.

A further object of the present invention is to provide an adjustable fluid amplified shock absorber which, in addition to bring adjustable, can at a particular portion of its stroke, cease to function as a shock absorber.

Yet another object of the present invention is to provide an improved adjustable fluid amplified shock absorber which can be adjusted for different levels of shock absorption in an extremely simple and unique manner. Other objects and attendant advantages of the present invention will readily be perceived hereafter.

The present invention relates to an adjustable fluid amplified shock absorber comprising a casing, a piston rod slidable in said casing, a chamber within said casing, a piston head, mounting means mounting said piston head on said piston rod within said chamber, channel means operatively associated with said piston head for providing fluid amplified flow, and means for adjusting the size of said channel means to thereby vary the level at which said fluid amplified flow occurs. The various aspects of the present invention will be more fully understood when the following portions of the specification are read in conjunction with the accompanying drawing wherein:

BRIEF DESCRIPTION OF THE DRAWINGS

FIG. 1 is a fragmentary cross sectional view of the adjustable fluid amplified shock absorber of the present invention;

FIG. 2 is a fragmentary cross sectional view taken substantially along line 2—2 of FIG. 1;

FIG. 3 is a fragmentary cross sectional view taken substantially along line 3—3 of FIG. 1;

FIG. 4 is a fragmentary cross sectional view taken substantially along line 4—4 of FIG. 1;

FIG. 5 is a fragmentary cross sectional view taken substantially along line 5—5 of FIG. 1;

FIG. 6 is a fragmentary cross sectional view taken substantially along line 6—6 of FIG. 1;

FIG. 7 is a cross sectional view of a modified embodiment of the present invention;

FIG. 8 is a cross sectional view taken substantially along line 8—8 of FIG. 7;

FIG. 9 is a graph representing the manner in which the embodiment of FIGS. 7 and 8 operates;

FIG. 10 is a fragmentary view, partially in cross section, showing another embodiment of the present invention;

FIG. 10A is a fragmentary cross sectional view taken substantially along line 10A—10A of FIG. 10;

FIG. 11 is a fragmentary view, partially in cross section, showing still another embodiment of the present invention;

FIG. 12 is an enlarged fragmentary cross sectional view taken substantially along line 12—12 of FIG. 11; and FIG. 13 is a fragmentary view, partially in cross section, showing still another modified embodiment of the present invention.

DESCRIPTION OF THE PREFERRED EMBODIMENTS

One embodiment of the improved adjustable fluid amplified shock absorber is depicted in FIGS. 1—6. The adjustable fluid amplified shock absorber 10 includes a casing 11 preferably fabricated of plastic which has a piston rod 12 slidable within bore 13 in end 14 of the casing. An annular lip 15 provides a seal for piston rod 12. A plug 17 is threaded into casing 11 and a frustoconical surface 19 at the end of plug 17 bears against mating frustoconical surface 20 to provide a fluid-tight connection. A chamber 21 contains a suitable compressible liquid such as silicone liquid or freon.

In accordance with the present invention, the piston head 22, which is mounted at the end of piston rod 12, is adjustable to provide different amplitudes or levels of fluid dampened shock absorption. More specifically, piston head 22 is internally threaded at 23 for mating threaded engagement with threads 24 on enlarged portion 25 of piston rod 12. An annular groove 27 is located between piston rod portion 25 and enlarged head 29 at the end of piston rod 12. The enlarged head 29 has a spherical outer surface 30 which merges into frustoconical surface 31. An inner frustoconical surface 32 is formed on piston head 22 and is located in spaced relationship to frustoconical surface 31 to define a space 33 therebetween. Surfaces 31 and 32 are inclined relative to the longitudinal axis of the piston rod. An annular groove 34 is formed in piston head 22 and is located generally in opposition to annular groove 27 of the piston rod. A plurality of circumferentially spaced axial bores 35 are located in piston head 22, and these bores terminate at 37.

The fluid amplified flow occurs when the piston rod 12 with piston head 22 mounted thereon moves to the left in FIG. 1 so that there will be a flow of compressible fluid from portion 39 of chamber 21 into portion 40 of chamber 21. This flow is around spherical surface 30, through space 33, through annular grooves 27 and 34, and through bores 35. The fluid amplification occurs because of the compression of the compressible fluid as it passes through the restricted annular space or channel 33 and thereafter expands in the space between grooves 27 and 34 before it flows through bores 35. The spherical surface 30 is instrumental in producing a smooth flow which provides fluid amplification. It will be appreciated, however, that other configurations may also be utilized which contribute to fluid amplification.

In accordance with the present invention, the annular space or channel 33 can be varied in size in order to adjust the amplitude or force level at which fluid amplified flow occurs. More specifically, when space or channel 33 is larger, the fluid amplified flow will occur at lower pressures which are experienced in chamber 39, and when the channel 33 is smaller, the fluid amplified flow will occur at higher pressures in chamber 39. When it is desired to adjust the size of annular channel 33, the piston rod 12 is moved to its limit to the right in FIG. 1 until serrations 41, which are located on the rear inclined surface of piston head 22, mesh with corresponding grooves 42 located on inclined surface 43 of cylinder 11. After such meshing engagement is effected, piston head 22 will be held stationary relative to cylinder 11, and thereafter piston rod 12 can be rotated to thread it axially relative to piston head 22, which will result in changing the size of channel 33. After the foregoing adjustment has been effected, the piston rod 12 can be moved to the left in FIG. 1 to thereby disengage piston head 22 from cylinder surface 43. The piston head 22 will maintain its adjusted position on piston rod 12 because of the friction fit between threads 23 and 25.

In FIGS. 7-9 an alternate embodiment of the present invention is disclosed. In this embodiment the adjustable fluid amplified shock absorber 44 includes a casing 45 having an end portion 47 which receives piston rod 49 in bore 50 therein, with a seal being provided by annular flexible lip 51. The piston head 22 is identical in all respects to the piston head 22 described above relative to FIGS. 1-6, and the structure at 52 of the casing is identical to structure 43 disclosed above relative to FIGS. 1-6 so that piston head 22 can be axially adjusted on piston rod 49.

In the embodiment of FIG. 7, an outer casing a sleeve 53 is slidably mounted on the outer surface 54 of casing 45, and the end of piston rod 49 is pinned to end wall 55 of casing 53 at 57. Casing 53 functions as a guide sleeve and stabilizes piston rod 49, and when casing 53 is rotated, the adjustment can be made between piston head 22 and piston rod 49 to adjust the levels at which fluid amplification will occur. This is depicted in the graph of FIG. 9 showing a low adjustment curve and a high adjustment curve.

The embodiment of FIGS. 7 and 8 includes structure which causes the adjusted fluid amplified shock absorption to cease when the piston head 22 reaches a predetermined portion of its travel. More specifically, chamber 59, which contains the compressible liquid, is divided into chamber portions 60 and 61 which are on opposite sides of chamfer 62 which extends circumferentially only about a portion of the inner surface of casing 45. In this respect, chamber portion 60 is of a first diameter and chamber portion 61 is an enlarged portion of slightly larger diameter of chamber 59 in that wall 63 is offset from wall 64 of chamber 60. Thus, fluid amplified flow will be realized when piston head 22 is operating within chamber portion 60, but once it passes beyond chamfer 62, which functions to produce pressure relief, there will be a loss of pressure on the face of piston head 22, and thus the fluid amplified flow will cease as depicted by lines 65 and 67 on the two graphs in FIG. 9. The casing 53, functioning as a guide sleeve, stabilizes the piston rod 49 when piston head 22, is operating within chamber portion 61.

In FIG. 10 a still further embodiment of the present invention is disclosed. In this embodiment the adjustable fluid amplified shock absorber 70 has the capability of normally acting as a locking member except when external forces above a predetermined magnitude are applied thereto. Shock absorber 70 includes a casing 71 which is normally attached to an external structure such as the seat 72 of an automotive vehicle. The piston rod 73 has a knob 74 pinned thereto, and knob 74 is rotatably mounted in a frame portion 75 of the vehicle. Thus, shock absorber 70 is essentially a link between seat 72 and vehicle frame 75.

A piston head 77 has an O-ring 79 mounted in annular groove 80 for providing a seal with the internal surface 81 of casing 71. Piston head 77 has a cylindrical bore 82 which is slidably mounted on cylindrical surface 83 of enlarged piston rod portion 84. Cylindrical portion 83 is interrupted by a flat 85 formed thereon. Otherwise, surface 83 is cylindrical in all its other portions. The foregoing is depicted in FIG. 10A. Thus, there is a channel 87 between piston rod portion 84 and the adjacent surface of piston head 77. In addition, an annular groove 89 is formed on piston rod 73 between cylindrical portion 84 and frustoconical portion 90 which merges into spherical portion 91. An annular channel 92 is located between frustoconical surface 90 and frustoconical surface 93 on piston head 77. A nut 94 is threadably mounted on thread 95 on piston rod 73, and it has a series of circumferentially spaced bores 97 therein. A spring in the form of a bellows member 99 has its opposite ends affixed between facing surfaces of piston head 77 and nut 94. The inclined annular surface 100 of nut 94 is serrated in the same manner as discussed above relative to piston head 22 of FIG. 1, and the casing 71 has an internal shoulder which is serrated in the same manner as discussed above relative to part 43 of FIG. 1. Thus, when the serrations on nut 94 engage the mating grooves within casing 71, nut 94 will be held stationary, and thus knob 74 can be rotated to turn piston rod 73 to cause the nut 94 to move axially on piston rod 73 because of the threaded connection therebetween.

Normally shock absorber 70 acts as a lock between the seat 72 and the vehicle frame 75 to hold the vehicle seat in a predetermined adjusted position. This occurs because normally surfaces 85 and 90 are in engagement to close off channel 92. In order to adjust the position of the seat, knob 74 is rotated to open the channel 92 to permit flow of compressible liquid from chamber portion 101 to chamber portion 102 as seat 72 is moved. The flow is through channel 92, channel 87 (FIG. 10A), the space 103 within flexible bellows 99, and bores 97 in nut 94. After the seat has been adjusted, knob 74 is turned until frustoconical surface 90 engages frustoconical surface 93, and thus there is a liquid lock produced by the closing of channel 92 because fluid cannot now flow from chamber portion 101 to chamber portion 102.

Whenever an impact occurs so that the seat is forced to move in the direction of arrow 104, the pressure within chamber portion 101 will force piston head 77 to move to the right against the bias of bellows spring 99 to thereby open channel 92 and thus permit a fluid amplified flow of liquid to occur from chamber portion 101 to chamber portion 102. The fluid amplification occurs when the liquid is compressed in channel 92 and subsequently expands in the area of groove 89. The degree to which channel 92 opens will be determined by the force exerted by spring 99 onto piston head 77, and this force is determined by the position to which nut 94 has been adjusted. More specifically, if nut 94 is more to the right on threads 95, the force exerted by spring 99 will be less, and if nut 94 is more to the left on threads 95, the force exerted by spring 99 on piston head 77 will be more. After the impact force no longer exists, spring 99 will expand to cause piston head 77 to move to the left and cause surface 93 thereon to engage the frustoconical surface 90 to thereby close channel 92.

In FIGS. 11 and 12 a still further embodiment of the present invention is disclosed. The adjustable fluid amplified shock absorber 105 includes a casing 107 and a piston rod 109 slidably received in portion 110 thereof. A piston head 111 is threadably mounted on piston rod portion 112. An O-ring 113 is suitably received in a groove in piston head 111 and provides a seal between the piston head and the internal surface 114 of the casing 107. The beveled end 115 of piston head 111 is serrated as described above relative to serrations 41 of FIG. 1, and a serrated grooved portion (not shown) is provided within the casing 107 as described above relative to the other embodiments so that when piston head 111 is engaged with the serrated portions of the casing 107, the piston head 111 will remain stationary, and thus when piston rod 109 is rotated, the piston head 111 can move axially relative thereto. The piston rod end portion includes a spherical outer portion 117 which merges into frustoconical portion 119 which is spaced from frustoconical portion 120 of the piston head 111. An annular groove 121 is located as shown. The helical threads 122 on piston rod portion 112 are the shape shown in FIG. 12. Mating helical threads 123 of the shape shown in FIG. 12 are formed on piston head 111. The fluid amplified flow is effected from chamber portion 124 to chamber portion 125 through channel 127 and thereafter the flow of liquid continues through the helical space 129 between threads 122 and threads 123. As noted above, the fluid amplification occurs when the liquid is compressed in channel 127 and subsequently expands in the area of groove 121.

In FIG. 13 a modification is disclosed which can be applied to any of the preceding embodiments but it will be described only relative to FIGS. 1-6 for the sake of convenience. In this respect, the end 29 of the piston rod has a pin 130 therein. The piston head 22 had a pin 131 therein. As can be seen from FIG. 13, pin 131 will limit the amount of rotation of piston rod 12 to one turn. Thus, pins 130 and 131 define the limits of adjustability of the fluid amplified flow, thereby precluding the possibility of excessive relative movement between the piston rod and the piston head which would either prevent flow or permit too great a flow.

The two graphs in FIG. 9 are representative of all of the embodiments of the present invention in the sense that they depict two of the levels at which fluid amplification can occur. It will be appreciated that the level of fluid amplification can be adjusted to any desired value within the capability of the particular shock absorber. It will be appreciated that where the cylinder is not enlarged, as in FIG. 7, the square wave will extend for a greater portion of the stroke. For example, if the cylinder of FIG. 7 was not enlarged, the square waves could extend beyond the 4.0 marking on the graphs, and the drop offs at 65 and 67 would be more to the right.

While the above description has disclosed specific ways of how the channel can be varied in size by changing the spacing between the piston head and piston rod, it is contemplated that the size of the channel can be changed by mechanism which (1) changes the size of orifices in the piston head or (2) changes the spacing between the piston head and the cylinder wall. Also it is contemplated that the channel for providing fluid amplified flow can be in the piston rod, and the channel adjustment mechanism can also be located in the piston rod for providing different levels of fluid amplified flow.

While preferred embodiments of the present invention have been disclosed, it will be appreciated that it is not limited thereto but may be otherwise embodied within the scope of the following claims.

What is claimed is:

1. An adjustable fluid amplified shock absorber comprising a casing, compressible fluid in said casing, a piston rod slidable in said casing, a chamber within said casing, a piston head, mounting means mounting said piston head on said piston rod within said chamber, channel means operatively associated with said piston head and having an unrestricted smooth entry portion for receiving said compressible fluid and providing fluid amplified flow, and means for adjusting the size of said channel means to thereby vary the level at which said fluid amplified flow occurs.

2. An adjustable fluid amplified shock absorber as set forth in claim 1 wherein said channel means are effectively located between said piston head and said piston rod.

3. An adjustable fluid amplified shock absorber as set forth in claim 2 wherein said channel means comprises the space between a first surface effectively located on said piston rod and a second surface on said piston head, said first and second surfaces being inclined relative to the longitudinal axis of said piston rod.

4. An adjustable fluid amplified shock absorber as set forth in claim 3 wherein said first and second inclined surfaces are frustoconical.

5. An adjustable fluid amplified shock absorber as set forth in claim 4 wherein said smooth entry portion includes a spherical end on said piston rod proximate said first surface.

6. An adjustable fluid amplified shock absorber as set forth in claim 1 wherein said mounting means comprise a threaded connection between said piston head and said piston rod.

7. An adjustable fluid amplified shock absorber as set forth in claim 6 including interengaging means between said piston head and said casing for selectively holding said piston head against rotation to thereby permit said piston rod to be threaded relative to said piston head.

8. An adjustable fluid amplified shock absorber as set forth in claim 7 wherein said channel means comprises the space between a first surface on said piston rod and a second surface on said piston head, said first and second surfaces being inclined relative to the longitudinal axis of said piston rod.

9. An adjustable fluid amplified shock absorber as set forth in claim 8 wherein said first and second inclined surfaces are frustoconical.

10. An adjustable fluid amplified shock absorber as set forth in claim 7 wherein said interengaging means comprise serrations on said piston head and mating surfaces on said casing for receiving said serrations.

11. An adjustable fluid amplified shock absorber comprising a casing, a piston rod slidable in said casing, a chamber within said casing, a piston head, mounting means mounting said piston head on said piston rod within said chamber, channel means operatively associated with said piston head for providing fluid amplified flow, means for adjusting the size of said channel means to thereby vary the level at which said fluid amplified flow occurs, said mounting means movably mounting said piston head on said piston rod, said channel means being located between said piston head and said piston rod, said mounting means comprising a nut threadably mounted on said piston rod, means slidably mounting said piston head on said piston rod, and spring means between said nut and said piston head.

12. An adjustable fluid amplified shock absorber as set forth in claim 1 wherein said spring means normally bias said channel means to a closed position.

13. An adjustable fluid amplified shock absorber as set forth in claim 11 wherein said channel means comprises the space between a first inclined surface on said piston rod and a second inclined surface on said piston head.

14. An adjustable fluid amplified shock absorber as set forth in claim 13 wherein said first and second inclined surfaces are frustoconical.

15. An adjustable fluid amplified shock absorber as set forth in claim 13 wherein said channel means include a flat on said piston rod proximate said means for slidable mounting said piston head on said piston rod.

16. An adjustable fluid amplified shock absorber as set forth in claim 1 wherein said spring means comprises a bellows member.

17. An adjustable fluid amplified shock absorber comprising a casing, a piston rod slidable in said casing, a chamber within said casing, a piston head, mounting means mounting said piston head on said piston rod within said chamber, channel means operatively associated with said piston head for providing fluid amplified flow, means for adjusting the size of said channel means to thereby vary the level at which said fluid amplified flow occurs, said mounting means movably mounting said piston head on said piston rod, said channel means being located between said piston head and said piston rod, said mounting means comprising a threaded connection between said piston head and said piston rod, and said threaded connection comprising mating threads with a helical space therebetween.

18. An adjustable fluid amplified shock absorber as set forth in claim 17 wherein said channel means comprises the space between a first inclined surface on said piston rod and a second inclined surface on said piston head.

19. An adjustable fluid amplified shock absorber as set forth in claim 18 wherein said first and second inclined surfaces are frustoconical.

20. An adjustable fluid amplified shock absorber as set forth in claim 19 wherein said piston rod includes an end which is spherical proximate said first surface.

21. An adjustable fluid amplified shock absorber as set forth in claim 1 including pressure relief means in said casing for terminating fluid amplified flow at a predetermined portion of the stroke of said piston head.

22. An adjustable fluid amplified shock absorber as set forth in claim 21 wherein said pressure relief means comprise an enlarged portion of said chamber.

23. An adjustable fluid amplified shock absorber as set forth in claim 22 including a guide sleeve slidably mounted on said casing, and means attaching said guide sleeve to said piston rod for movement therewith to thereby stabilize said piston rod when said piston head enters said enlarged portion of said chamber.

24. An adjustable fluid amplified shock absorber as set forth in claim 1 wherein said channel means comprise spaced frustoconical surfaces effectively located between said piston rod and said piston head.

25. An adjustable fluid amplified shock absorber as set forth in claim 24 wherein said spaced frustoconical surfaces are substantially parallel to each other to cause said channel means to be elongated and have axially spaced portions thereof spaced substantially equidistantly in all adjusted positions of said channel means.

* * * * *

UNITED STATES PATENT AND TRADEMARK OFFICE
CERTIFICATE OF CORRECTION

PATENT NO. : 4,877,114

DATED : October 31, 1989

INVENTOR(S) : Paul H. Taylor

It is certified that error appears in the above-identified patent and that said Letters Patent is hereby corrected as shown below:

Column 3, line 33, change "a" to --or--.

Column 7, line 6 (claim 12), change "1" to --11--;

line 22 (claim 16), change "1" to --11--.

Signed and Sealed this

Twenty-fifth Day of September, 1990

Attest:

HARRY F. MANBECK, JR.

*Attesting Officer*      *Commissioner of Patents and Trademarks*